United States Patent
Yoneoka

(10) Patent No.: US 10,034,016 B2
(45) Date of Patent: Jul. 24, 2018

(54) CODING APPARATUS, COMPUTER SYSTEM, CODING METHOD, AND COMPUTER PRODUCT

(71) Applicant: FUJITSU LIMITED, Kawasaki-shi, Kanagawa (JP)

(72) Inventor: Noboru Yoneoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 443 days.

(21) Appl. No.: 14/823,422

(22) Filed: Aug. 11, 2015

(65) Prior Publication Data

US 2015/0350670 A1 Dec. 3, 2015

Related U.S. Application Data

(63) Continuation of application No. PCT/JP2013/059760, filed on Mar. 29, 2013.

(51) Int. Cl.
*H04N 19/56* (2014.01)
*H04N 19/573* (2014.01)
(Continued)

(52) U.S. Cl.
CPC .......... *H04N 19/56* (2014.11); *H04N 19/176* (2014.11); *H04N 19/53* (2014.11); *H04N 19/57* (2014.11);
(Continued)

(58) Field of Classification Search
None
See application file for complete search history.

(56) References Cited

U.S. PATENT DOCUMENTS 5,801,778 A * 9/1998 Ju .................. H04N 19/105
375/240.06
2004/0105589 A1 6/2004 Kawaharada et al.
(Continued)

FOREIGN PATENT DOCUMENTS

JP 11-55676 2/1999
JP 2000-287214 10/2000
(Continued)

OTHER PUBLICATIONS

A Dynamic Search Range Algorithm for Stabilized Reduction of Memory Traffic in Video Encoder, Jung et al., IEEE Transactions on circuits and systems for video technology, vol. 20, No. 7, Jul. 2010.*
(Continued)

*Primary Examiner* — Janese Duley
(74) *Attorney, Agent, or Firm* — Fujitsu Patent Center

(57) ABSTRACT

A coding apparatus includes identifying circuitry that identifies based on a count of frames coded referring to a reference frame among a series of frames, a count of vectors specifying search positions on the reference frame of a given frame when detection is performed for a motion vector of a block of the given frame to be coded among the series of frames; and determining circuitry that determines based on the member count and a maximum read data volume that can be read in of the reference frame per unit time, for a single given frame of the series of frames, a first maximum read data volume for a single given frame when image data is read in of a search range that includes a search position specified on the reference frame by a motion vector of a block on a reduced image obtained by reducing the given frame.

9 Claims, 12 Drawing Sheets

(51) Int. Cl.
*H04N 19/176* (2014.01)
*H04N 19/593* (2014.01)
*H04N 19/53* (2014.01)
*H04N 19/57* (2014.01)
*H04N 19/59* (2014.01)

(52) U.S. Cl.
CPC ........... *H04N 19/573* (2014.11); *H04N 19/59* (2014.11); *H04N 19/593* (2014.11)

(56) References Cited

U.S. PATENT DOCUMENTS

| | | | | |
|---|---|---|---|---|
| 2006/0188021 | A1* | 8/2006 | Suzuki | H04N 19/105 375/240.16 |
| 2007/0092006 | A1* | 4/2007 | Malayath | H04N 19/156 375/240.16 |
| 2007/0098075 | A1* | 5/2007 | Ohgose | H04N 19/61 375/240.16 |
| 2007/0109875 | A1 | 5/2007 | Tanaka et al. | |
| 2008/0170616 | A1* | 7/2008 | Hwang | H04N 19/105 375/240.16 |
| 2008/0204602 | A1* | 8/2008 | Beric | H04N 19/56 348/699 |
| 2008/0205527 | A1* | 8/2008 | Watanabe | H04N 19/51 375/240.16 |
| 2014/0233645 | A1* | 8/2014 | Sakamoto | H04N 19/0003 375/240.13 |

FOREIGN PATENT DOCUMENTS

| | | |
|---|---|---|
| JP | 2007-096696 | 4/2007 |
| JP | 2007-116293 | 5/2007 |
| JP | 2007-166521 | 6/2007 |
| JP | 2011-71622 | 4/2011 |
| JP | 4675383 | 4/2011 |
| WO | 2007-055013 | 5/2007 |

OTHER PUBLICATIONS

"Hierarchical Motion Estimation Algorithms with especially low hardware costs" Yu et al., IEEE Transactions on Consumer Electronics, vol. 44, Issue: 1, pp. 125-129, Feb. 1998 (Year: 1998).*

"An Advanced Hierarchical Motion Estimation Scheme With Lossless Frame Recompression and Early-Level Termination for Beyond High-Definition Video Coding", Bao et al., IEEE Transactions on Multimedia, vol. 14, No. 2, Apr. 2012 (Year: 2012).*

EESR—The Extended European Search Report for European Patent Application No. 13880280.6 dated Feb. 9, 2016.

International Search Report, mailed in connection with PCT/JP2013/059760 and dated May 14, 2013 (2 pages).

* cited by examiner

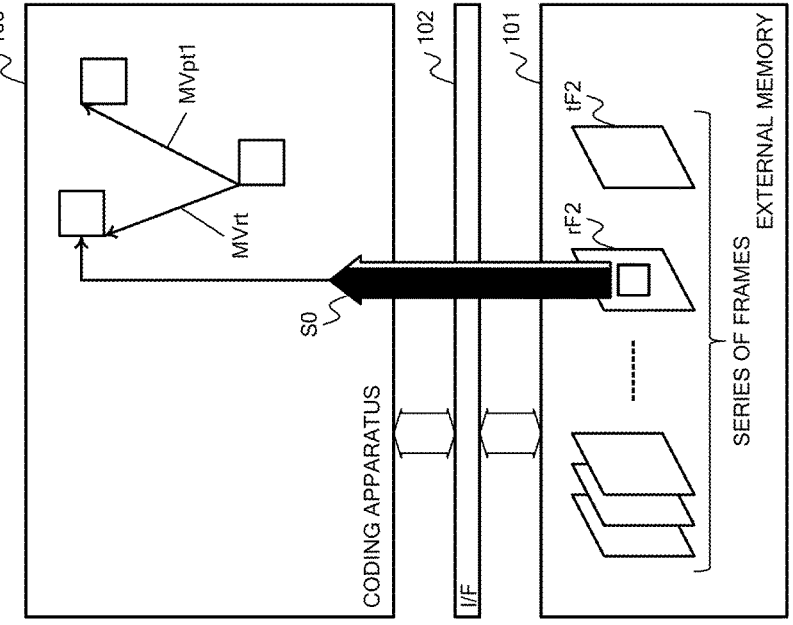
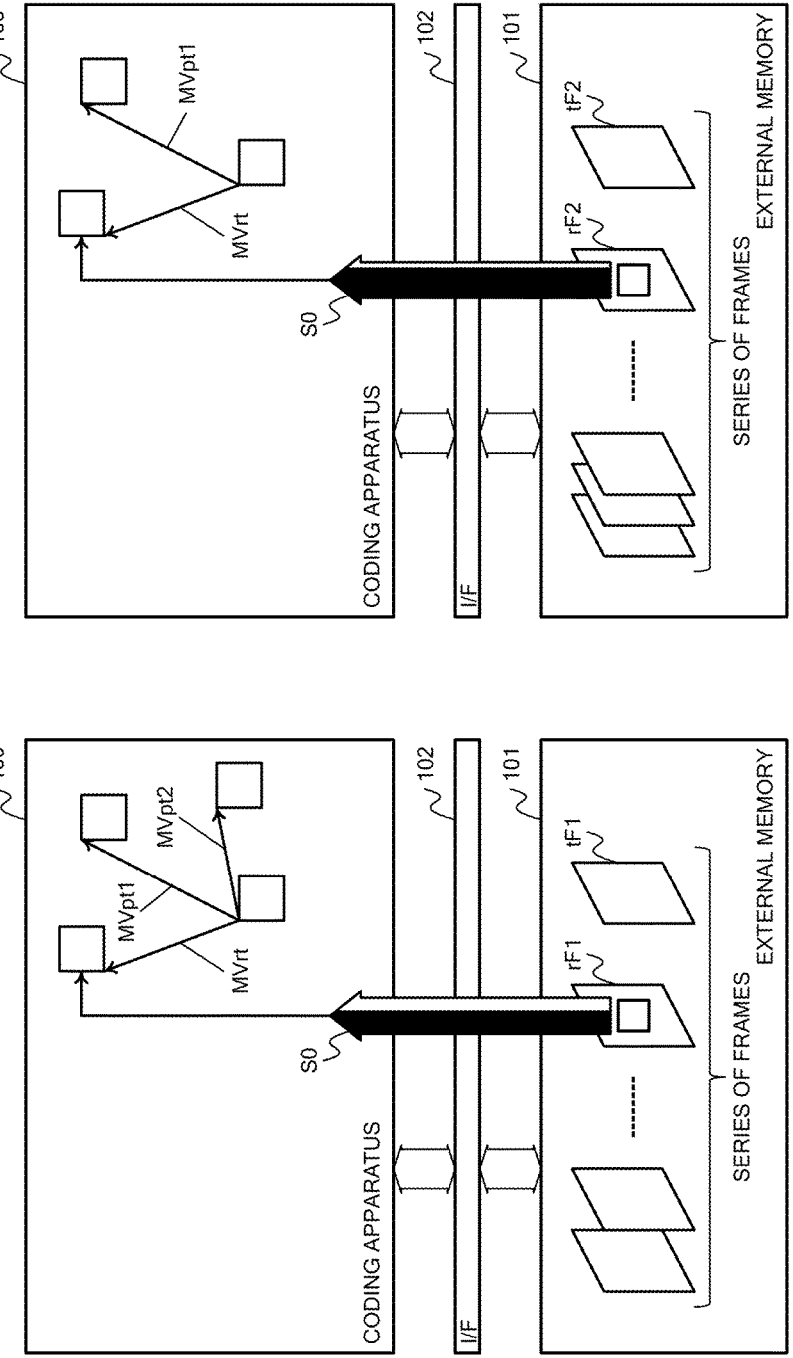

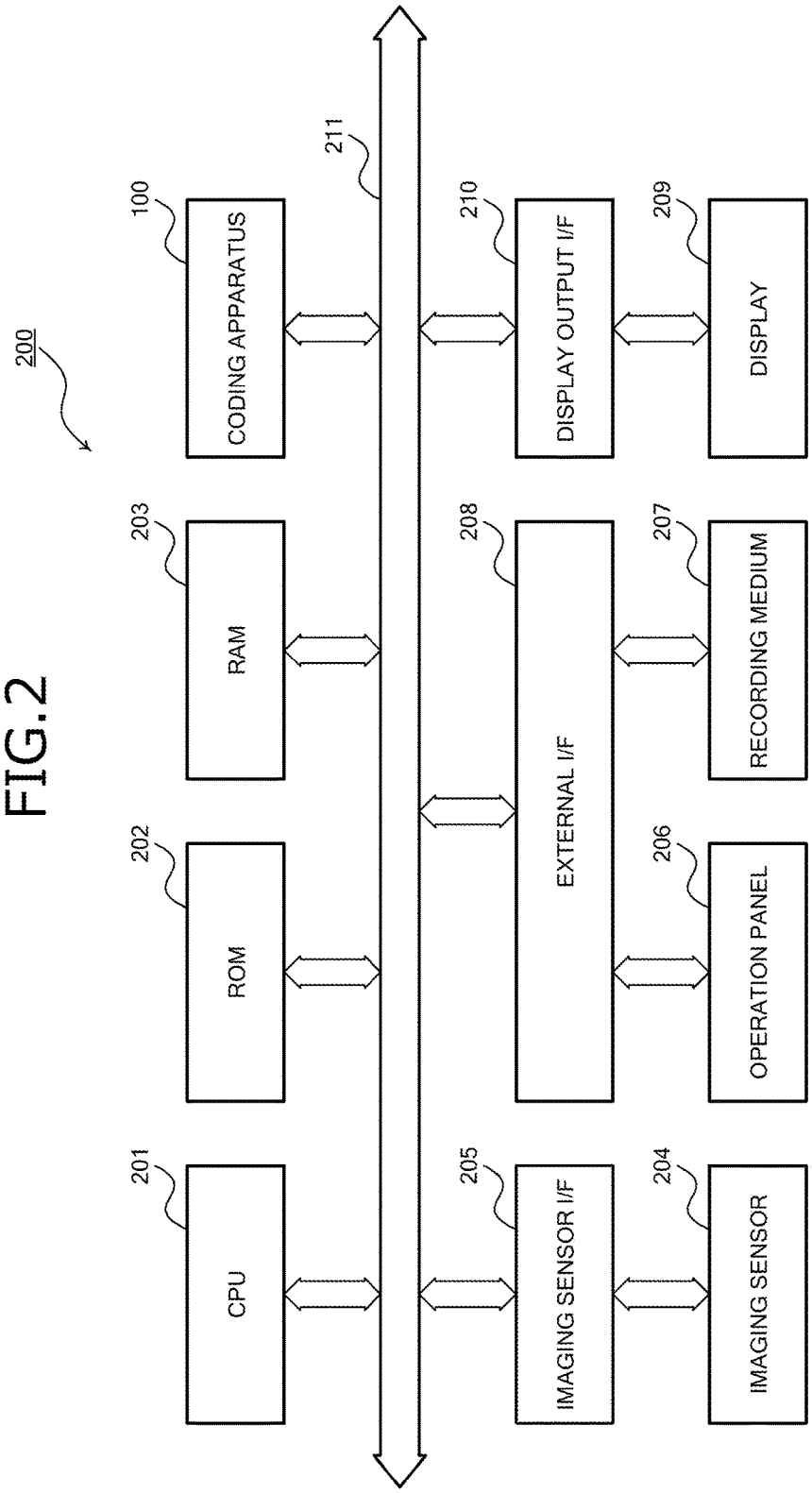

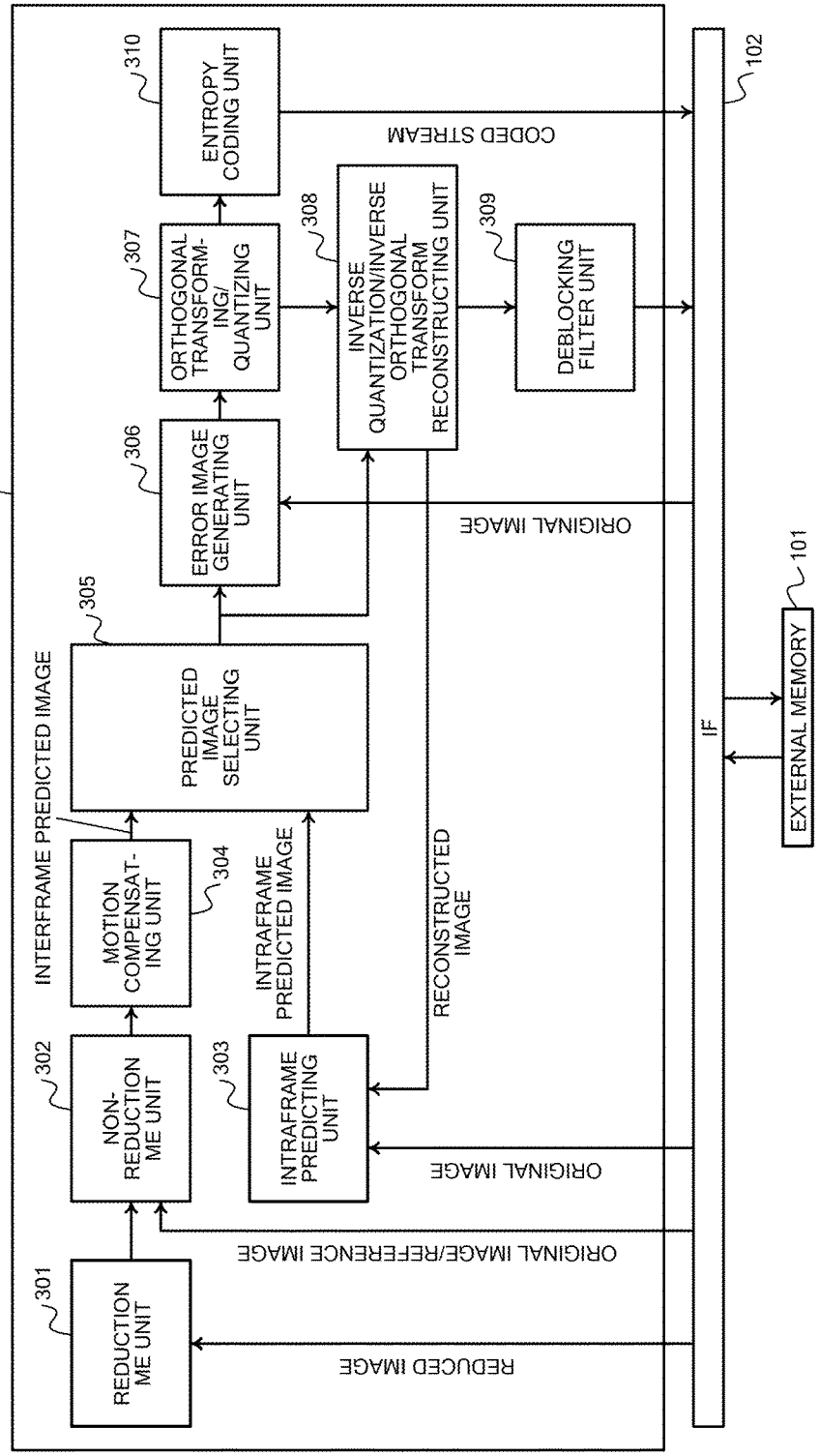

| | SEARCH RANGE CANDIDATE A | SEARCH RANGE CANDIDATE B | SEARCH RANGE CANDIDATE C | SEARCH RANGE CANDIDATE D |
|---|---|---|---|---|
| REDUCTION MOTION VECTOR | ○ | ○ | ○ | ○ |
| UPPER ADJACENT VECTOR ADDITION | - | ○ | - | ○ |
| TEMPORAL PREDICTION VECTOR ADDITION | - | - | ○ | ○ |
| READ DATA VOLUME | RA | RB | RC | RD |

CODING APPARATUS, COMPUTER SYSTEM, CODING METHOD, AND COMPUTER PRODUCT

CROSS REFERENCE TO RELATED APPLICATIONS

This application is a continuation application of International Application PCT/JP2013/059760, filed on Mar. 29, 2013 and designating the U.S., the entire contents of which are incorporated herein by reference.

FIELD

The embodiments discussed herein are related to a coding apparatus, a computer system, a coding method, and a computer product.

BACKGROUND

Conventionally, a reference frame is searched for a block that is similar to a given block into which a given frame that is to be coded in video has been divided; and a difference in spatial positioning from the given block to the similar block is detected as a motion vector of the given block. According to a related technique, for example, a search range for motion vector detection in an advanced search using a source image that is based on a reduction motion vector detected using a reduced image, is expanded in an area that is of the access granularity of external memory and image data is read in from the external memory. Further, according to another technique, when the size of a read area on a reference image that includes areas respectively specified by motion vectors that have been extracted from video stream exceeds a threshold, data on the reference image that corresponds to areas specified by each of the motion vectors is read in by a discrete access sequence (for example, refer to Japanese Laid-Open Patent Publication No. 2011-071622 and Published Japanese-Translation of PCT Application, Publication No. 2007/055013)

Nonetheless, with the conventional techniques, reading in data of a search range specified by a reduction motion vector together with reading in data of a search range specified by plural motion vectors may lead to increased read data volumes and delays of processing involved in frame coding.

SUMMARY

According to an aspect of an embodiment, a coding apparatus includes an identifying circuitry configured to identify based on a count of frames coded referring to a reference frame among a series of frames, a member count of a vector group specifying search positions on the reference frame that is referred to for a given frame when detection of a motion vector is performed, the motion vector being of a block divided from the given frame that is to be coded among the series of frames; and a determining circuitry configured to determine based on the member count identified by the identifying circuitry and a maximum read data volume that can be read in of the reference frame per unit time, for a single given frame of the series of frames, a first maximum read data volume for a single given frame when image data is read in of a search range that includes a search position specified on the reference frame by a motion vector of a block on a reduced image obtained by reducing the given frame.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A and 1B are diagrams depicting operation examples of a coding apparatus according to an embodiment;

FIG. 2 is a block diagram depicting an example of hardware configuration of a computer system;

FIG. 3 is a block diagram depicting an example of hardware configuration of the coding apparatus;

DESCRIPTION OF EMBODIMENTS

Figure 4:
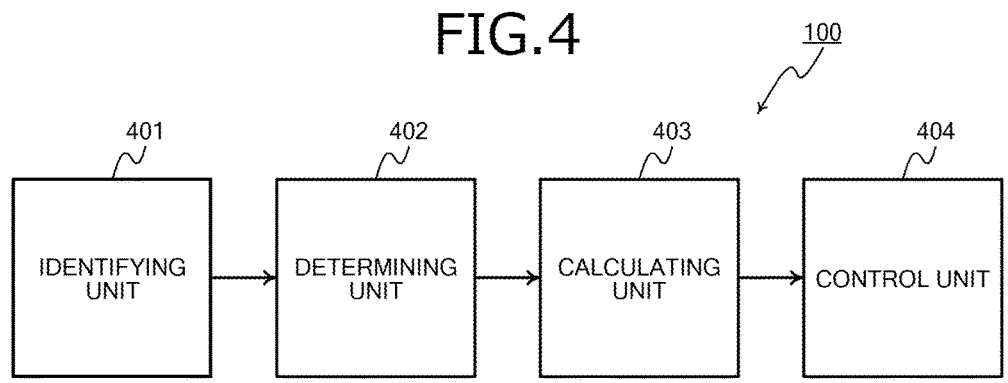
FIG. 4 is a block diagram depicting a functional example of the coding apparatus.

Embodiments of a coding apparatus, a computer system, a coding method, a coding program, and a recording medium will be described in detail with reference to the accompanying drawings.

FIGS. 1A and 1B are diagrams depicting operation examples of the coding apparatus according to an embodiment. A coding apparatus 100 is a computer configured to perform motion detection according to a video coding scheme compliant with the standards of Moving Picture Experts Group (MPEG) 2, H.264, etc. The coding apparatus 100 further performs hierarchical motion detection.

Here, hierarchical motion detection is a technique of performing motion detection processing using a reduced image obtained by reducing a given frame and a reduced image obtained by reducing a reference frame; and with respect to a search range that is on a reference frame and identified from a detected motion vector, performing motion detection processing for the given frame. Hereinafter, motion detection processing for a reduced image of a given frame will be referred to as "reduction motion estimation (ME) processing". Further, motion detection processing for a given frame will be referred to as "non-reduction ME processing".

Motion detection processing is a process of searching a reference image for a block that is similar to an original block that has been divided from a given image; and outputting, as a motion vector, the difference in spatial positioning from the original block. Here, the given image is a reduced image in the case of reduction ME processing and is a given frame in the case of non-reduction ME processing. A block is an image obtained by dividing a given image or reference image by a unit such as 8×8 [pixels], 16×16 [pixels], etc., i.e., a so-called macroblock.

More specifically, in the reduction ME processing, the coding apparatus 100 detects a motion vector by using a reduced image obtained by reducing a given frame by a given reduction rate and an image obtained by reducing a reference image. A motion vector detected in the reduction ME processing will be referred to as "reduction motion vector" hereinafter. More specifically, the coding apparatus 100 calculates for each candidate vector that is a motion vector candidate, an evaluation value that represents differences between the original block and the reference block that corresponds to the candidate vector. The coding apparatus 100 outputs, as the reduction motion vector, the candidate vector for which the calculated evaluation value is the smallest, for example.

Subsequently, in the non-reduction ME processing, the coding apparatus 100 uses the given frame and a reference frame to again search for a motion vector in a search range that includes search positions that are on the reference frame and specified by the reduction motion vector.

The evaluation value, for example, is calculated by calculating the cumulative sum of values representing the difference between corresponding pixels of the original block and the reference block. The evaluation value is an index for determining the degree of similarity of the original block and the reference block. The value representing differences between pixels, for example, is the difference of pixel values between pixels. A pixel value is color information indicated by a pixel and, for example, may be a component value such as the luminance component value, blue color-difference component value, red color-difference component value, etc., or a component value such as the red component value, green component value, blue component value, etc.

The evaluation value, for example, is the sum of absolute difference (SAD), the sum of absolute transformed difference (SATD), etc.

Thus, the method of detecting a motion vector by the reduction ME processing and the non-reduction ME processing can reduce the volume of image data read from external memory storing the reference frame, as compared to a case of referring to the entire reference frame to detect a motion vector.

Further, since coding efficiency and image quality are improved, when a motion vector is searched for at the original resolution, a search range may be searched that includes search positions specified by an added group of vectors that differ from the reduction motion vector. In this case, the search range of the reference image when a motion vector is searched for at the original resolution becomes a range that is a combination of a search range centering on the reduction motion vector and a search range centering on an added vector that is different. Improvement of the coding efficiency indicates that the coding volume of coded video has decreased and has become more compressed as compared to the video before coding.

An added vector that is different will be referred to as "prediction vector" hereinafter. Prediction vectors include spatial prediction vectors and temporal prediction vectors. Prediction vectors will be described in further detail with reference to FIGS. 7 and 10.

Thus, in a case where a prediction vector is added when a motion vector is detected at the original resolution, the search range of the reference image increases. As a result, the memory bandwidth used increases and may exceed the available memory bandwidth. If the used memory bandwidth exceeds the available memory bandwidth, for example, in a case where coding is performed in real-time, operational failure occurs where frames are dropped.

Thus, the coding apparatus 100 according to the present embodiment determines the maximum read data volume for the reduction motion vector, according to a prediction vector count and the reference frame data volume that can be read during a unit of time, when motion detection for a block of a frame is performed. As a result, the coding apparatus 100 suppresses delays in processing involved in frame coding and facilitates improved coding efficiency.

FIGS. 1A and 1B depict the coding apparatus 100 and external memory 101 storing a series of frames. The coding apparatus 100 and the external memory 101 are connected by an interface (I/F 102). The coding apparatus 100 depicted in FIG. 1A is assumed to select and code a given frame tF1 among the series of frames. Further, the maximum reference frame read data volume that can be read per unit time for one given frame of the series of frames is assumed to be determined by the memory bandwidth of the external memory 101. The maximum reference frame read data volume that can be read per unit time for one given frame of the series of frames is assumed to be Ssum. Ssum will be described with reference to FIG. 11.

In this case, the coding apparatus 100 identifies based on a count of frames coded referring to a reference frame among the series of frames, a member count of the vector group specifying search positions on a reference frame rF1 that is a reference for the given frame tF1. The member count of the vector group is the number of vectors included in the vector group. Since a count of temporal prediction vectors can be identified by the number of frames coded referring to a reference frame among the series of frames, a prediction vector count can be identified.

More specifically, the coding apparatus 100 depicted in FIG. 1A identifies a count of 3 as the member count of the vector group including a reduction motion vector MVrt, a prediction vector MVpt1, and a prediction vector MVpt2. Subsequently, the coding apparatus 100 determines based on the identified count and Ssum, a first maximum read data volume S0 for one given frame when image data is read of a search range that includes search positions specified on a reference frame rF1 by the reduction motion vector. For example, the coding apparatus 100 decreases the first maximum read data volume S0 the greater the identified count is. Described in greater detail, the coding apparatus 100 determines the first maximum read data volume S0=Ssum×0.7 when the identified count is 3.

The coding apparatus 100 depicted in FIG. 1B is assumed to select and code a given frame tF2 among the series of frames. The coding apparatus 100 identifies based on the count of frames coded referring to a reference frame among the series of frames, the member count of the vector group specifying search positions on a reference frame rF2 that is a reference for the given frame tF2. The coding apparatus 100 depicted in FIG. 1B identifies a count of 2 as the member count of the vector group, including a reduction motion vector MVrt and prediction vector MVpt1. The coding apparatus 100 determines the first maximum read data volume S0=Ssum×0.8 when the identified count is 2.

In FIGS. 1A and 1B, the magnitude of the first maximum read data volume S0 is expressed by the amount that the arrow connecting the external memory 101 and the coding apparatus 100 is filled in. In this manner, the coding apparatus 100 suppresses the occurrence of restrictions related to a reduction motion vector MVrt when the prediction vector count is few and facilitates improved coding efficiency. Details of the coding apparatus 100 will be described with reference to FIGS. 2 to 13.

An example of hardware of a computer system 200 to which the coding apparatus 100 is applied will be described. The computer system 200, for example, is a system having a function of recording and playing video; and more specifically, for example, is a personal computer, a television, a recorder, a smartphone, a video camera, a digital camera, and the like.

FIG. 2 is a block diagram depicting an example of hardware configuration of a computer system. In FIG. 2, the computer system 200 includes a central processing unit (CPU) 201, read-only memory (ROM) 202, and random access memory (RAM) 203. The computer system 200 further includes an imaging sensor 204, an imaging sensor interface (I/F) 205, an operation panel 206, a recording medium 207, an external I/F 208, and the coding apparatus 100.

The computer system 200 further includes a display 209 and a display output I/F 210. The CPU 201 to the RAM 203, the imaging sensor I/F 205, the external I/F 208, the display output I/F 210, and the coding apparatus 100 are mutually connected by a bus 211. The external memory 101 depicted in FIGS. 1A and 1B corresponds to a storage apparatus such as the RAM 203 and the recording medium 207. When the external memory 101 corresponds to the RAM 203, the I/F 102 depicted in FIGS. 1A and 1B corresponds to an I/F between the RAM 203 and the bus 211, although not depicted in FIG. 2. Further, when the external memory 101 corresponds to the recording medium 207, the I/F 102 corresponds to the external I/F 208.

The CPU 201 is computation processing apparatus that governs overall control of the computer system 200. The ROM 202 is non-volatile memory storing therein programs such as a boot program of the computer system 200. The RAM 203 is volatile memory used as a work area of the CPU 201.

The imaging sensor 204 is an apparatus that converts light from a physical object into an electronic signal. For example, the imaging sensor 204 is a charge coupled device (CCD), a complementary metal oxide semiconductor (CMOS), etc.

The imaging sensor I/F 205 is an apparatus that controls the imaging sensor 204 during recording and thereby, converts a signal from the imaging sensor 204 into an image format and stores the result to the RAM 203. The operation panel 206 is a liquid crystal touch panel, operation button, etc. of the computer system 200. The recording medium 207 is a storage apparatus such as flash ROM. Further, the recording medium 207 may store the coding program according to the present embodiment. The external I/F 208 controls the operation panel 206 and the recording medium 207. Further, the external I/F 208 may be connected to a network such as a local area network (LAN), a wide area network (WAN), and the Internet via a communications line, and to an apparatus other than the computer system 200 through the network.

The display 209 displays the image format recorded by the imaging sensor 204. The display output I/F 210 controls the display 209.

FIG. 3 is a block diagram depicting an example of hardware configuration of the coding apparatus. The coding apparatus 100 includes a reduction ME unit 301, a non-reduction ME unit 302, an intraframe predicting unit 303, a motion compensating unit 304, a predicted image selecting unit 305, and an error image generating unit 306. The coding apparatus 100 further includes an orthogonal transforming/quantizing unit 307, an inverse quantization/inverse orthogonal transform reconstructing unit 308, a deblocking filter unit 309, and an entropy coding unit 310.

The reduction ME unit 301 reads a given coded image that has been reduced and a reduced reference image from external memory, and performs reduction ME processing. The non-reduction ME unit 302 reads an original image at the original resolution and a reference image at the original resolution from external memory, and performs non-reduction ME processing. The intraframe predicting unit 303 performs intraframe prediction processing.

The motion compensating unit 304 generates an interframe predicted image based on the motion vector determined by the non-reduction ME unit 302.

The predicted image selecting unit 305 selects any one among the interframe predicted image and an intraframe predicted image, according to coding processing control. The error image generating unit 306 calculates a difference between the predicted image output by the predicted image selecting unit 305 and the original image.

The orthogonal transforming/quantizing unit 307 performs orthogonal transform and quantization processing on a differential image. The inverse quantization/inverse orthogonal transform reconstructing unit 308 performs inverse quantization and inverse orthogonal transform for a coefficient after quantization and obtains a reconstructed image by adding to the predicted image.

The deblocking filter unit 309 performs deblocking filter processing, which removes block noise. The entropy coding unit 310 performs entropy coding processing with prediction information and/or a coefficient as input, and generates a coded stream.

Functions of the coding apparatus 100 will be described. FIG. 4 is a block diagram depicting a functional example of the coding apparatus. The coding apparatus 100 includes an identifying unit 401, a determining unit 402, a calculating unit 403, and a control unit 404. The identifying unit 401 and the determining unit 402 are functions performed before the reduction ME unit 301 is executed. The calculating unit 403 is included in both the reduction ME unit 301 and the non-reduction ME unit 302. The control unit 404 controls the reduction ME unit 301 and the non-reduction ME unit 302.

Further, functions of the identifying unit 401 to the control unit 404 forming a control unit may be realized by executing on the CPU 201, a program stored in storage apparatus. The storage apparatus, more specifically, for example, is the ROM 202, the RAM 203, the recording medium 207, etc. depicted in FIG. 2.

The identifying unit 401 identifies based on a count of frames coded referring to a reference frame among a series of frames, the member count of a vector group specifying search positions on a reference frame that is a reference for a given frame. The identifying unit 401 is executed when a motion vector of a block divided from a given frame is detected by the reduction ME unit 301 and the non-reduction ME unit 302.

Further, the identifying unit 401 may identify a count of motion vectors of blocks adjacent to a block divided from the given frame or a count of motion vectors of blocks at the same positions as blocks divided from the given frame among frames coded referring to a reference frame. The motion vector of a block adjacent to a block divided from a given frame will be described with reference to FIG. 7. The motion vector of a block at the same position as a block divided from a given frame among frames coded referring to a reference frame will be described with reference to FIG. 7.

Further, the identifying unit 401 may identify a count of motion vectors of blocks adjacent to a block divided from the given frame and a count of motion vectors of blocks at the same positions as blocks divided from the given frame among frames coded referring to a reference frame. Identified counts of frames are stored to a storage area such as a flip flop in the coding apparatus 100.

The determining unit 402 determines based on the count identified by the identifying unit 401 and Ssum, the first maximum read data volume S0 for a single frame when image data is read in of a search range that includes search positions specified on a reference frame by a reduction motion vector. An example of a determination procedure for S0 will be described with reference to FIG. 10, for example.

Based on the count identified by the identifying unit 401, Ssum, and S0, the determining unit 402 may further determine a second maximum read data volume S1 for a single frame when image data is read in of a search range that includes search positions specified on a reference frame by a prediction vector.

The calculating unit 403 calculates based on the first maximum read data volume determined by the determining unit 402 and a count of blocks included in the given frame, a first threshold S0_b that corresponds to a given block selected from among blocks divided from the given frame. A calculation procedure for S0_b will be described with reference to FIGS. 5 and 6.

The calculating unit 403 may further calculate a second threshold Ssum_b that corresponds to the given block, based on the first maximum read data volume and the second maximum read data volume determined by the determining unit 402 and a count of blocks included in the given frame. Concerning Ssum_b, the same procedure as the calculation procedure for S0_b can be employed. The calculated S0_b and Ssum_b are stored to a storage area such as a flip flop in the coding apparatus 100.

The control unit 404 controls based on the first threshold S0_b calculated by the calculating unit 403, the read data volume for a search range that includes search positions specified on a reference frame by a reduction motion vector that corresponds to the given block, when a motion vector of the given block is detected. For example, the control unit 404 controls the reduction ME unit 301 such that a reduction motion vector that does not exceed S0_b is detected.

The control unit 404, when the following condition is satisfied, may control the read data volume for a search range that includes search positions on a reference frame specified by a reduction motion vector that corresponds to a block that is to be selected subsequent to the given block. The condition is a case where the first threshold S0_b is less than the read data volume of the search range that includes the search positions specified on the reference frame by the reduction motion vector that corresponds to the given block. Details of control will be described with reference to FIG. 5.

Based on the second threshold Ssum_b calculated by the calculating unit 403, the control unit 404 may further control the read data volume for a search range that includes search positions on a reference frame specified by a vector group that corresponds to the given block, when the motion vector of the given block is detected. For example, the control unit 404 controls the non-reduction ME unit 302 such that the search range does not exceed Ssum_b. For example, the control unit 404 may narrow the search range that includes search positions on a reference frame specified by a prediction vector.

The control unit 404 may control the read data volume by selecting from among combinations of reduction motion vectors and prediction vectors, a combination for which the read data volume of a search range that includes search positions on a reference frame specified by vectors included in the combination is less than or equal to the second threshold.

More specifically, the control unit 404 selects the combination for which the read data volume of the search range that includes search positions specified on the reference frame by vectors included in the combination is less than or equal to the second threshold. The control unit 404 controls the non-reduction ME unit 302 such that image data of the search range that includes search positions specified on the reference frame by vectors included in the selected combination is read in. Details of control will be described with reference to FIG. 13.

Figure 5:
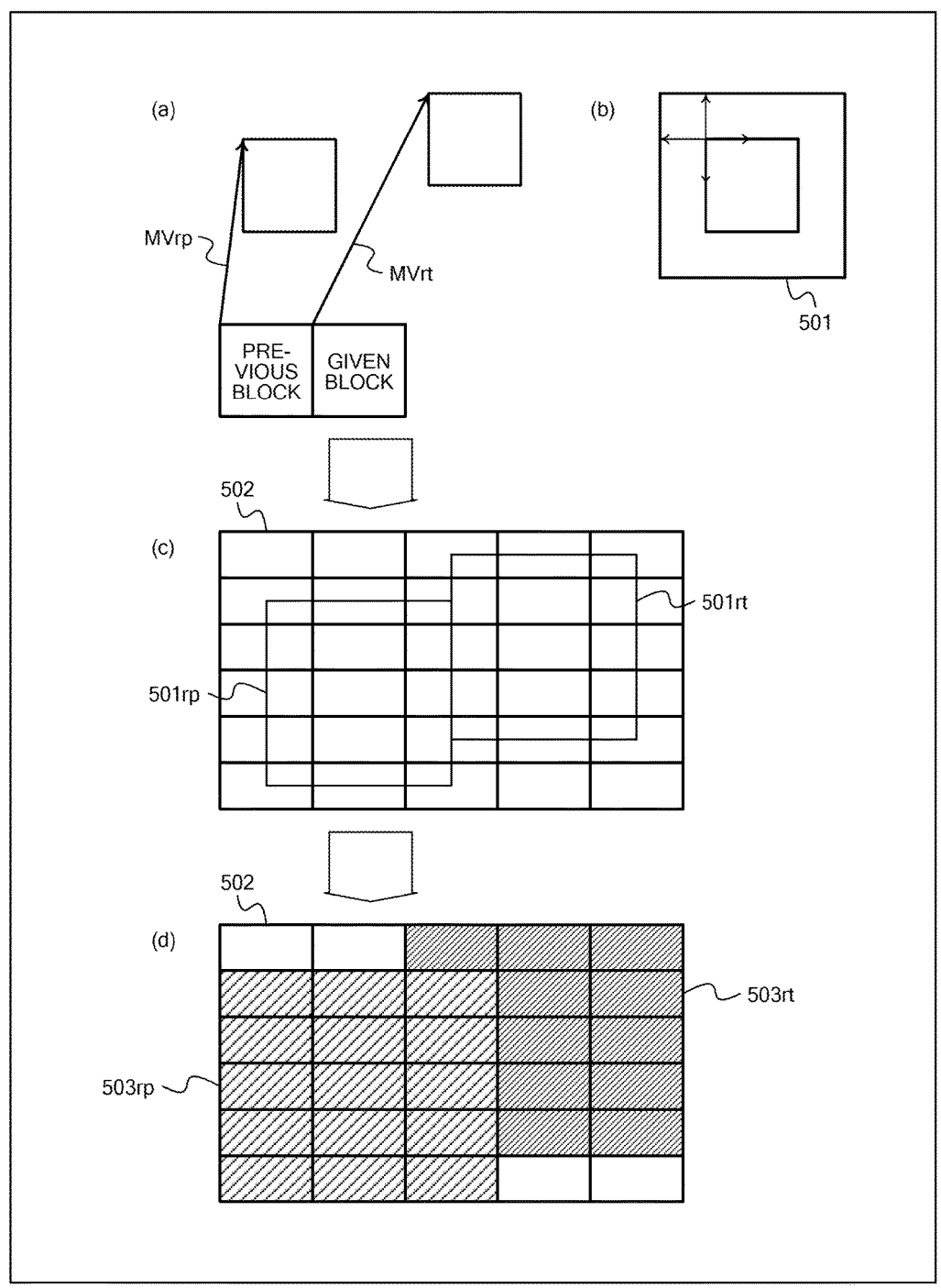
FIG. 5 is a diagram depicting an example of a calculation procedure for a non-reduction motion estimation (ME) search range in reduction ME.

FIG. 5 is a diagram depicting an example of a calculation procedure for a non-reduction ME search range in reduction ME. FIG. 5 describes an example of calculating a search range in a case where a reduction motion vector MVrt obtained in a reduction motion search for a given block, a reduction motion vector MVrp of the previous block as input, and a reduction motion vector MVrt of the given block in non-reduction ME are used.

(a) of FIG. 5 depicts the positional relation of the reduction motion vector MVrp of the previous block and the reduction motion vector MVrt of the given block. The reduction motion vector MVrp and the reduction motion vector MVrt tend to be similar values.

(b) of FIG. 5 depicts a non-reduction ME reference area. The non-reduction ME reference area in each block is a reference area 501 that has been expanded to the range to be searched by non-reduction ME in a motion destination block for which the reduction motion vector MVrt has been scaled to the same magnification. The coding apparatus 100, when accessing the reference area 501 of each of the blocks, performs access by a memory alignment unit that corresponds to the smallest access granularity of the external memory. A storage area of the memory alignment unit will be referred to as "alignment area" hereinafter.

(c) of FIG. 5 depicts an alignment area 502. Memory alignment, for example, may be 1 line or a rectangle of 8×4=32 [bytes], etc. In the present embodiment, memory alignment is assumed to be a rectangle of 32 [bytes]. (c) of FIG. 5 depicts a reference area 501rp identified from the reduction motion vector MVrp in the previous block and a reference area 501rt identified from the reduction motion vector MVrt in the given block, respectively in the alignment area 502.

(d) of FIG. 5 depicts an example of accessing the reference area 501rp of the previous block by the memory alignment unit and an example of accessing the reference area 501rt of the given block. When the coding apparatus 100 attempts to access the reference area 501, the alignment area 502, which includes the reference area 501, is accessed. The storage area represented by the alignment area 502 is the search range. The data volume of the alignment area 502 will be referred to as "read data volume" hereinafter.

More specifically, when the coding apparatus 100 attempts to access the reference area 501*rp* of the previous block by the memory alignment unit, the coding apparatus 100 accesses an alignment area 503*rp* indicated by coarse hatching in (d) of FIG. 5.

Further, when the coding apparatus 100 attempts to access the reference area 501*rt* of the given block by the memory alignment unit, the coding apparatus 100 accesses an alignment area 503*rt* indicated by fine hatching in (d) of FIG. 5. The alignment area 503*rt* is an area that excludes from the alignment area referred to for the given block, an area that overlaps with the alignment area 503*rp* referred to for the previous block.

More specifically, the coding apparatus 100 calculates the read data volume of the given block to be 32×11=352 [bytes] when the reduction motion vector is used, since there are 11 rectangles in the alignment area 503*rt*.

The coding apparatus 100 compares the read data volume and S0_*b*. S0_*b* is a threshold of the read data volume for each block in a case where in the reduction ME processing, the reduction motion vector in non-reduction ME processing is used. If the read data volume is less than or equal to S0_*b*, the coding apparatus 100 performs a normal reduction motion search in the block subsequent to the given block. If the read data volume exceeds S0_*b*, the coding apparatus 100 places a restriction on the reduction motion search in the subsequent block. Contents of the restriction is, for example, bringing the reduction motion vector of the subsequent block near the reduction motion vector MVrt of the given block, or decreasing the reduction motion search range. By placing such a restriction, the size of the alignment area can be decreased when access is performed by the memory alignment unit of the subsequent block.

The first threshold S0_*b* for the read data volume may be a constant value for each block or variable according to block. A threshold calculation method in a case of a constant value for each block may be a method of taking the value obtained by dividing the read data volume allowed for 1 frame by the total block count in a frame. A threshold calculation method in a case of a variable value for each block will be described with reference to FIG. 6.

Figures 6, 7:
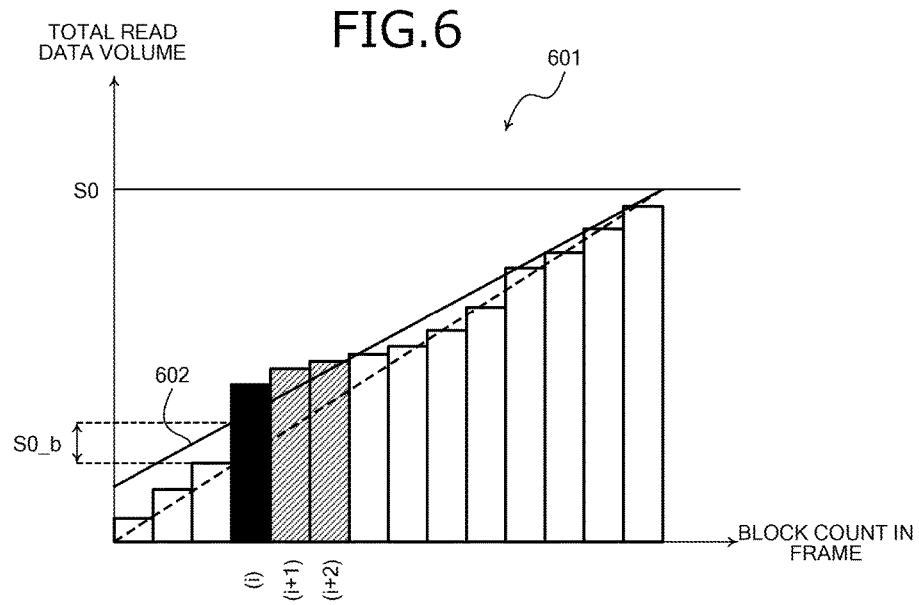
FIG. 6 is a diagram depicting an example of a calculation procedure for S0_b.
FIG. 7 is a diagram depicting a combination example when a prediction vector among search range candidates of non-reduction ME is added.

FIG. 6 is a diagram depicting an example of a calculation procedure for S0_*b*. FIG. 6 uses graph 601 to depict an example of a calculation procedure for S0_*b*.

The horizontal axis of graph 601 represents a block count in a frame. The vertical axis of graph 601 represents the total read data volume.

An upper limit line 602 depicted in graph 601 is a line used to converge the total read data volume to the targeted value S0 as the given block approaches the last block of 1 frame. In the blocks, if the total read data volume from the head block to the given block exceeds the upper limit line 602, the coding apparatus 100 sets S0_*b* for each block such that a restriction is placed on the reduction ME motion search. A concrete value of S0_*b* is the value obtained by subtracting from the read data volume of the upper limit line 602 corresponding to the position of the given block, the total read data volume up to the previous block.

For example, in graph 601, block (i) represented by a solid black bar is assumed to be the given block. Graph 601 indicates that the read data volume of the given block exceeds S0_*b*. In this case, the coding apparatus 100 places a restriction on the reduction ME motion search in block (i+1), which is the block subsequent to the given block. The coding apparatus 100 places a restriction on the reduction ME motion search for block (i+1) and the reduction ME motion search for block (i+2) such that the total read data volume up to the previous block becomes less than the read data volume indicated by the upper limit line 602 corresponding to the position of the given block.

FIG. 7 is a diagram depicting a combination example when a prediction vector among search range candidates of non-reduction ME is added. Prediction vectors include spatial prediction vectors and temporal prediction vectors. A spatial prediction vector is a motion vector resulting from non-reduction ME of a block to the left of a given block or a motion vector resulting from non-reduction ME of a block above a given block. The motion vector of a block to the left of a given block will be referred to as "left adjacent vector" hereinafter. Further, a motion vector of a block above a given block will be referred to as "upper adjacent vector" hereinafter.

A temporal prediction vector is a vector in a frame of a different time and scaled according to the temporal distance from a block at the same position as a given block. The temporal prediction vector will be described in detail with reference to FIG. 10.

Table 701 indicates search range candidates in 4 combinations of a reduction motion vector and prediction vectors. A first combination 701-A indicates a search range candidate A identified from a reduction vector, without addition of a prediction vector. Further, the read data volume of the search range candidate A is RA.

A second combination 701-B indicates addition of an upper adjacent vector as a prediction vector and a search range candidate B identified from a reduction motion vector and the upper adjacent vector. Further, the read data volume of the search range candidate B is RB.

A third combination 701-C indicates addition of a temporal prediction vector as a prediction vector and a search range candidate C identified from a reduction motion vector and the temporal prediction vector. Further, the read data volume of the search range candidate C is RC.

A fourth combination 701-D indicates addition of an upper adjacent vector and a temporal prediction vector as prediction vectors and a search range candidate D identified from a reduction motion vector, the upper adjacent vector, and the temporal prediction vector. Further, the read data volume of the search range candidate D is RD.

Table 701 depicted in FIG. 7 depicts a case where an upper adjacent vector is employed as a spatial prediction vector. For example, as a spatial prediction vector, a left adjacent vector may be employed, or at least any one among a left adjacent vector and an upper adjacent vector may be employed. When at least any one among the left adjacent vector and the upper adjacent vector is employed as a spatial prediction vector, the following 4 combinations exist in addition to the 4 combinations in table 701.

The first combination is a reduction motion vector and the left adjacent vector. The second combination is a reduction motion vector, the upper adjacent vector, and the left adjacent vector. The third combination is a reduction motion vector, the left adjacent vector, and a temporal prediction vector. The fourth combination is a reduction motion vector, the upper adjacent vector, the left adjacent vector, and a temporal prediction vector.

Further, there are cases when there are 0, 1, or 2 temporal prediction vectors. Determination criteria for the temporal prediction vector count will be described with reference to FIG. 10. When there is 1 spatial prediction vector and 0 temporal prediction vectors, there are 2 combinations of a reduction motion vector and prediction vectors. Further, when there is 1 spatial prediction vector and 2 temporal prediction vectors, there are 8 combinations of a reduction motion vector and prediction vectors.

Figure 8:
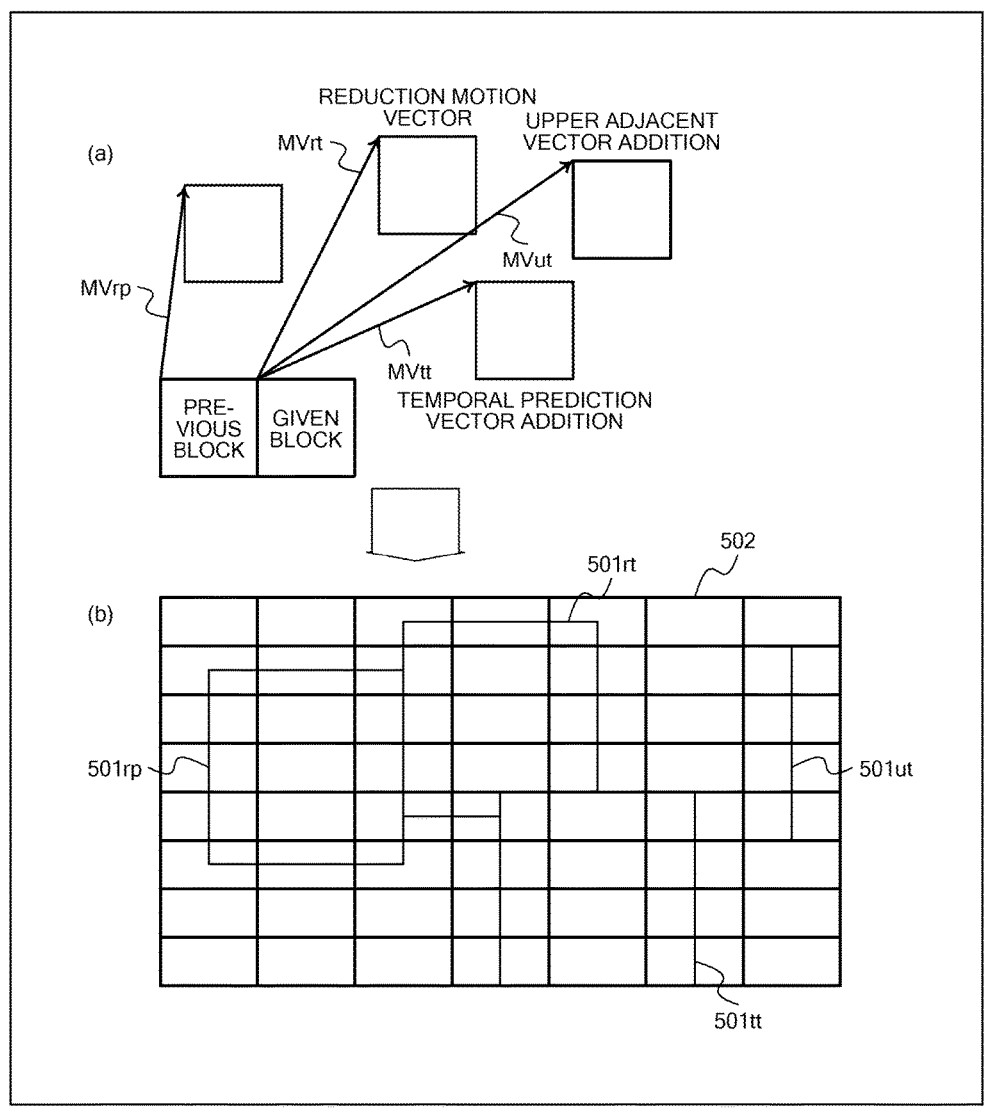
FIG. 8 is a diagram (part 1) depicting read data volumes of search range candidates of non-reduction ME.

FIG. 8 is a diagram (part 1) depicting the read data volumes of search range candidates of non-reduction ME. (a) of FIG. 8 depicts positional relations of the reduction motion vector MVrp of the previous block, the reduction motion vector MVrt of the given block, an upper adjacent vector MVut of the given block, and a temporal prediction vector MVtt of the given block.

(b) of FIG. 8 depicts the reference area 501rp, the reference area 501rt, the reference area 501ut identified from the upper adjacent vector MVut, and the reference area 501tt identified from the temporal prediction vector MVtt, respectively in the alignment area 502.

FIGS. 9A, 9B, 9C, and 9D are diagrams (part 2) depicting the read data volumes of search range candidates of non-reduction ME. FIGS. 9A, 9B, 9C, and 9D depict read data volumes RA to RD respectively of the search range candidates A to D.

Figure 9A:
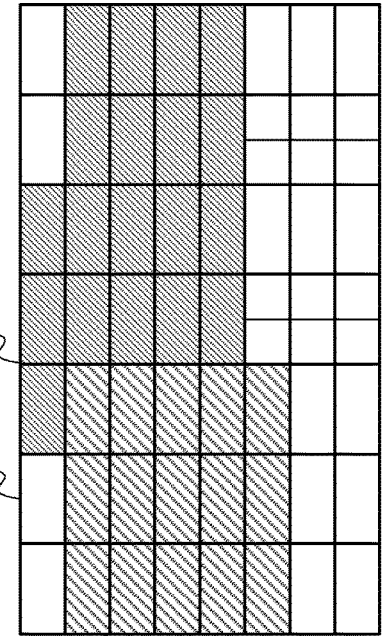
FIGS. 9A, 9B, 9C, and 9D are diagrams (part 2) depicting the read data volumes of search range candidates of non-reduction ME.
Figure 9B:
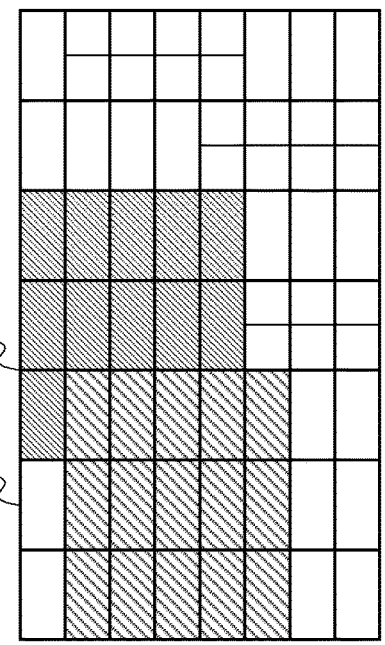
Figure 9C:
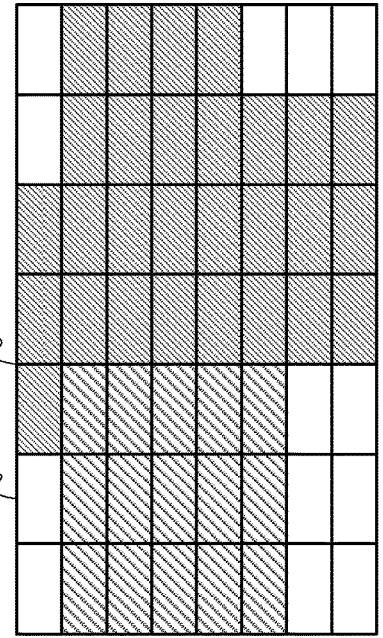
Figure 9D:
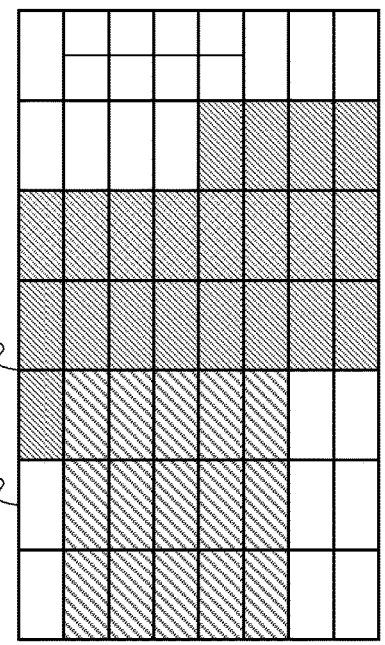

In FIG. 9A, since there are 11 rectangles in the search range candidate A, the coding apparatus 100 calculates the read data volume RA to be 32×11=352 [bytes]. In FIG. 9B, since there are 19 rectangles in the search range candidate B, the coding apparatus 100 calculates the read data volume RB to be 32×19=608 [bytes]. Further, in FIG. 9C, since there are 21 rectangles in the search range candidate C, the coding apparatus 100 calculates the read data volume RC to be 32×21=672 [bytes]. Similarly, in FIG. 9D, since there are 28 rectangles in the search range candidate D, the coding apparatus 100 calculates the read data volume RD to be 32×28=896 [bytes].

Figure 10:
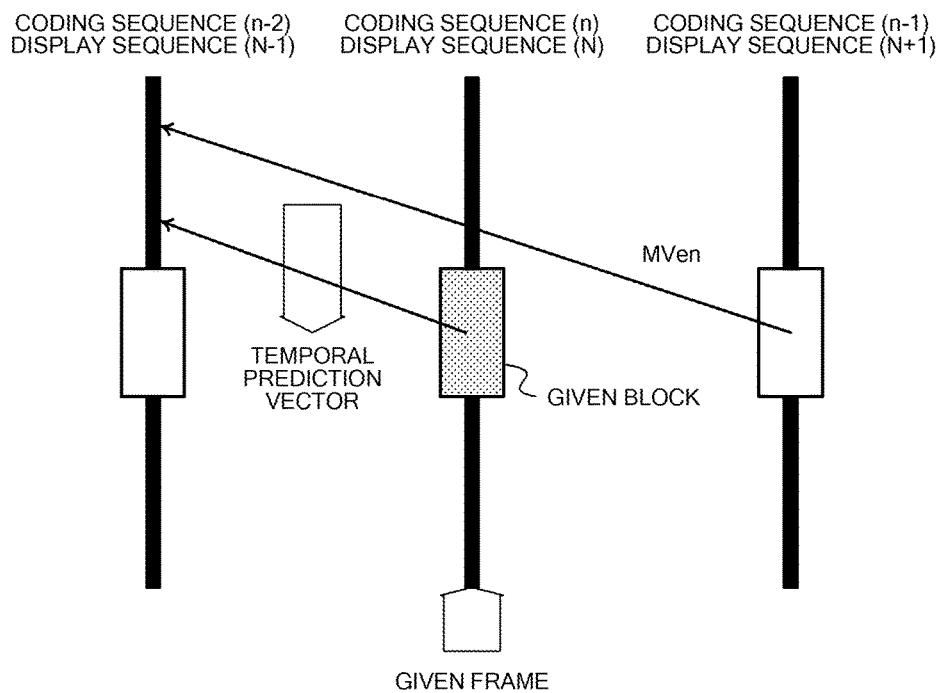
FIG. 10 is a diagram of a temporal prediction vector.

FIG. 10 is a diagram of a temporal prediction vector. FIG. 10 depicts an example of a temporal prediction vector. In FIG. 10, description will be given for a case where the given frame is a frame that is displayed N-th, counting from the head frame. Further, the given frame is assumed to be coded n-th. N and n are integers of 1 or greater.

The previous frame displayed (N−1)-th is assumed to be coded (n×2)-th. Further, the subsequent frame displayed (N+1)-th is assumed to be coded (n−1)-th. In a case where the display sequence and the coding sequence differ such as in FIG. 10, for example, the frame that is displayed N-th may refer to the frame displayed (N+1)-th. More specifically, the frame displayed N-th is coded after the frame displayed (N+1)-th has been coded and by referring to a decoded image obtained by decoding the coded data.

In this case, a temporal prediction vector of the given block is a vector of a frame that is different from the given frame and obtained by scaling according to the temporal distance of the reference frame, the motion vector of a block of the frame after coding, at the same position as the given block.

In the example depicted in FIG. 10, a motion vector MVen of the frame displayed (N+1)-th is the motion vector of the block at the same position as the given block. Further, when the temporal distance to the frame displayed (N−1)-th, which is the reference frame, is expressed by a frame count, the number of frames from the (N−1)-th frame to the given frame is 1 and the number of frames from the (N−1)-th frame to the (N+1)-th frame is 2. Therefore, the coding apparatus 100 calculates a vector that is ½ the magnitude of the motion vector MVen, as the temporal prediction vector.

A case where there are 0 temporal prediction vectors is a case where there is no frame coded referring to a reference frame among the series of frames, e.g., a case where the frame displayed (N+1)-th is a frame that performs intra-estimation. Further, a case where there is 1 temporal prediction vector is a case where there is 1 frame coded referring to a reference frame among the series of frames, e.g., the frame displayed (N+1)-th is a frame that performs inter-estimation.

A case where there are 2 temporal prediction vectors is a case where there are 2 frames coded referring to a reference frame among the series of frames. For example, the frame displayed (N+1)-th and the frame displayed (N−2)-th are frames that perform inter-estimation.

Figure 11:
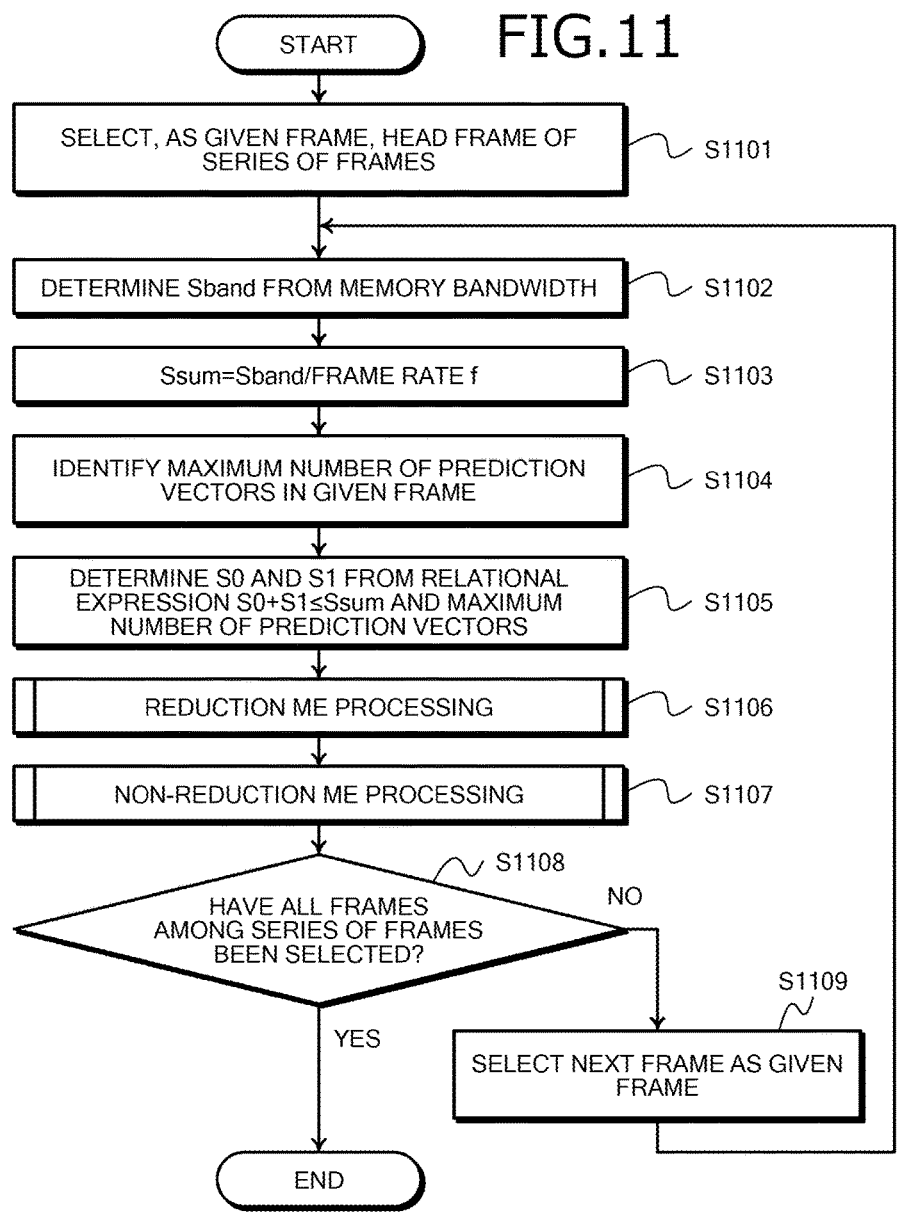
FIG. 11 is a flowchart depicting an example of a procedure of a coding process.
Figure 12:
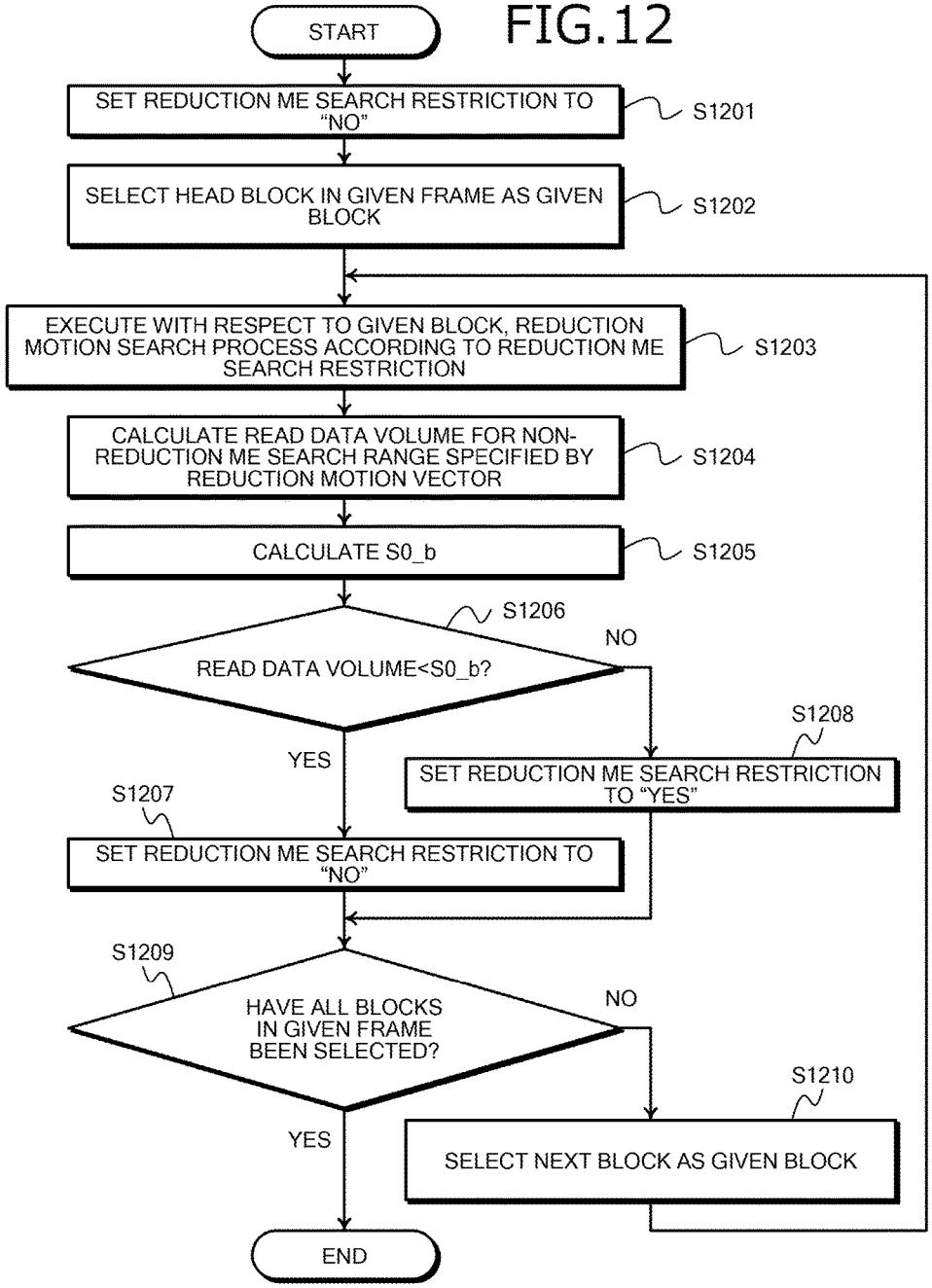
FIG. 12 is a flowchart depicting an example of a procedure of reduction ME processing.
Figure 13:
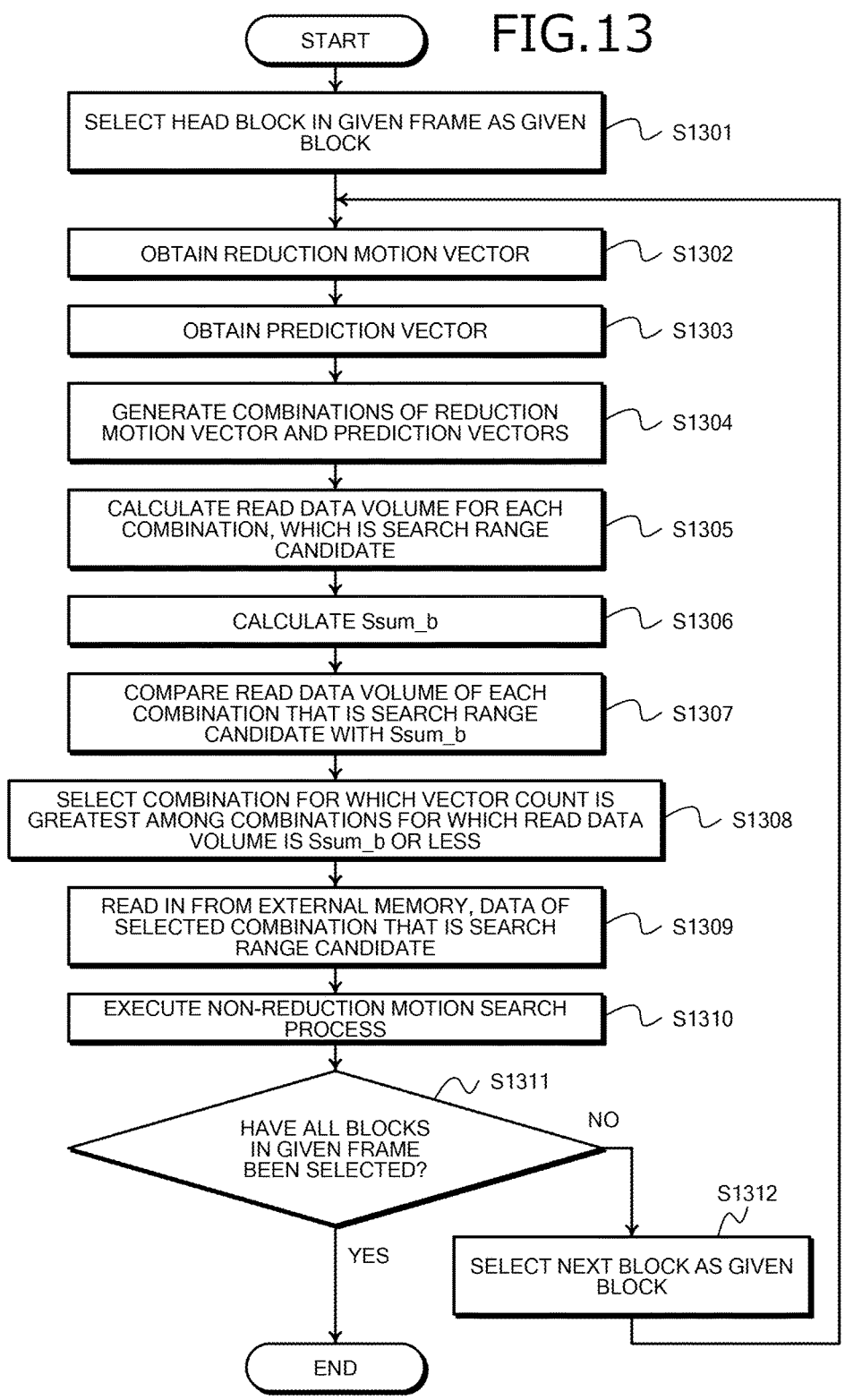
FIG. 13 is a flowchart depicting an example of a procedure of non-reduction ME processing.

Whether a temporal prediction vector that is the N-th motion vector, calculated using a motion vector of a frame displayed before the (N−1)-th frame, is allowed to be added to prediction vectors is dependent on the video coding scheme employed by the coding apparatus 100. Therefore, the coding apparatus 100 confirms whether the video coding scheme employed by the coding apparatus 100 allows a motion vector of a frame displayed before the (N−1)-th frame to be used as a temporal prediction vector of the N-th motion vector. If use is allowed, the coding apparatus 100 determines whether a frame displayed before the (N−1)-th frame is a frame coded referring to the frame displayed (N−1)-th and thereby, calculates the temporal prediction vector count. FIGS. 11 to 13 will be used to depict flowcharts executed by the coding apparatus 100.

FIG. 11 is a flowchart depicting an example of a procedure of a coding process. The coding process is a process of coding a series of frames. The coding apparatus 100 selects, as a given frame, the head frame of a series of frames (step S1101).

The coding apparatus 100 determines Sband from the memory bandwidth (step S1102). The memory bandwidth at step S1102 is a memory bandwidth that among memory bandwidths of the external memory 101, can be assigned to non-reduction ME processing of the coding process. Sband may be a constant value in the coding process, or may be variable. For example, in the computer system 200, when a lot of memory bandwidth is assigned to processes other than the coding process, the coding apparatus 100 may set Sband to be small temporarily. On the other hand, when there are few processes other than the coding process, the coding apparatus 100 may set Sband to be large temporarily.

The coding apparatus 100 calculates Ssum=Sband/coding frame rate f (step S1103). For example, if there are 60 frames in 1 second, the frame rate is 60. The coding apparatus 100 identifies the maximum number of prediction vectors in the given frame (step S1104).

The coding apparatus 100 determines S0 and S1 from the relational expression S0+S1≤Ssum and the maximum number of prediction vectors (step S1105). For example, when the temporal prediction vector count among the prediction vectors is 0, the coding apparatus 100 determines S0 and S1 such that S0+S1≤Ssum is satisfied and S0:S1=8:2. When the temporal prediction vector count among the prediction vectors is 1, the coding apparatus 100 determines S0 and S1 such that S0+S1≤Ssum is satisfied and S0:S1=7:3 is satisfied. Further, the coding apparatus 100 may set the ratio of S0 and S1 for a case where the temporal prediction vector count among the prediction vectors is 2.

The coding apparatus 100 executes reduction ME processing (step S1106). Details of the reduction ME processing will be described with reference to FIG. 12. The coding apparatus 100 executes non-reduction ME processing (step S1107). Details of the non-reduction ME processing will be described with reference to FIG. 13. After completion of the non-reduction ME processing, the coding apparatus 100 performs the rest of the coding process on the given frame by the motion compensating unit 304, the predicted image selecting unit 305, etc.

The coding apparatus 100 determines whether all frames among the series of frames have been selected (step S1108). If a frame has yet to be selected (step S1108: NO), the coding apparatus 100 selects the next frame as the given frame (step S1109). The coding apparatus 100 transitions to the operation at step S1102.

If all frames of the series of frames have been selected (step S1108: YES), the coding apparatus 100 ends the coding process. By executing the coding process, the coding apparatus 100 can code a series of frames without exceeding the memory bandwidth.

FIG. 12 is a flowchart depicting an example of a procedure of the reduction ME processing. The reduction ME processing is a process of detecting a reduction motion vector of a given block in a low resolution image.

The coding apparatus 100 sets the reduction ME search restriction to "no" (step S1201). The coding apparatus 100 selects the head block in a given frame as the given block (step S1202). The coding apparatus 100 executes with respect to the given block, a reduction motion search process according to the reduction ME search restriction (step S1203). The reduction motion search process in a case of a reduction ME search restriction is as described with reference to FIG. 5.

The coding apparatus 100 calculates the read data volume for the non-reduction ME search range specified by a reduction motion vector (step S1204). Calculation of the non-reduction ME search range specified by a reduction motion vector is as described with reference to (b) to (d) in FIG. 5. The coding apparatus 100 calculates $S0\_b$ (step S1205).

The coding apparatus 100 determines whether the read data volume is less than $S0\_b$ (step S1206). If the read data volume is less than $S0\_b$ (step S1206: YES), the coding apparatus 100 sets the reduction ME search restriction to "no" (step S1207). If the read data volume is greater than or equal to $S0\_b$ (step S1206: NO), the coding apparatus 100 sets the reduction ME search restriction to "yes" (step S1208).

After the operation at step S1207 or at step S1208, the coding apparatus 100 determines whether all the blocks in the given frame have been selected (step S1209). If a block in the given frame has yet to be selected (step S1209: NO), the coding apparatus 100 selects the next block as the given block (step S1210). The coding apparatus 100 transitions to the operation at step S1203.

If all blocks in the given frame have been selected (step S1209: YES), the coding apparatus 100 ends the reduction ME processing. By executing the reduction ME processing, the coding apparatus 100 detects a reduction motion vector and can reduce the read data volume of the next block to prevent the memory bandwidth from being exceeded when the read data volume exceeds $S0\_b$.

FIG. 13 is a flowchart depicting an example of a procedure of the non-reduction ME processing. The non-reduction ME processing is a process of searching, by block matching, a search range specified by a reduction motion vector.

The coding apparatus 100 selects the head block of a given frame as the given block (step S1301). The coding apparatus 100 obtains the reduction motion vector (step S1302). The coding apparatus 100 obtains a prediction vector (step S1303). The prediction vector is as described with reference to FIG. 7. The coding apparatus 100 generates combinations of the reduction motion vector and prediction vectors (step S1304). The coding apparatus 100 calculates a read data volume for each combination, which is a search range candidate (step S1305). The coding apparatus 100 calculates Ssum_b (step S1306). Ssum_b can be calculated by the same method as $S0\_b$.

The coding apparatus 100 compares the read data volume of each combination that is a search range candidate with Ssum_b (step S1307).

The coding apparatus 100 selects the combination for which the vector count is the greatest among the combinations for which the read data volume is Ssum_b or less (step S1308). If there are plural combinations for which the vector count is greatest, the coding apparatus 100 may select any combination among the combinations for which the vector count is greatest.

The coding apparatus 100 reads in from the external memory, data of the selected combination that is a search range candidate (step S1309). The coding apparatus 100 executes a non-reduction motion search process (step S1310). The coding apparatus 100 determines whether all blocks in the given frame have been selected (step S1311). If a block in the given frame has yet to be selected (step S1311: NO), the coding apparatus 100 selects the next block as the given block (step S1312). The coding apparatus 100 transitions to the operation at step S1302.

If all blocks have been selected (step S1311: YES), the coding apparatus 100 ends the non-reduction ME processing. By executing the non-reduction ME processing, the coding apparatus 100 detects a motion vector of a given block and can improve coding efficiency by adding prediction vectors to an extent that the memory bandwidth is not exceeded.

As described, according to the coding apparatus 100, when motion detection of a block of a frame is performed, the maximum read data volume S0 for the reduction motion vector is determined according to the prediction vector count and Ssum. In this manner, the coding apparatus 100 suppresses delays of processing involved in frame coding and improves coding efficiency. Since delays of processing involved in frame coding are suppressed, the coding apparatus 100 can prevent operational failures such as frame dropping consequent to exhaustion of the memory bandwidth, even in cases where prediction vectors are added and evaluation is performed.

According to the coding apparatus 100, when detection of a motion vector of a given block is performed, the read data volume of a search range specified by a reduction motion vector may be controlled based on the read data volume of the search range specified by the reduction motion vector and $S0\_b$. As a result, for each block in a given frame, the coding apparatus 100 performs control such that the read data volume of the search range specified by the reduction motion vector does not exceed $S0\_b$. Consequently, the coding apparatus 100 can suppress exhaustion of the memory bandwidth since the total read data volume of all the blocks also does not exceed S0.

According to the coding apparatus 100, when $S0\_b$ is less than the read data volume of the search range specified by the reduction motion vector that corresponds to a given block, the read data volume of a search range specified by a reduction motion vector that corresponds to a block selected subsequent to the given block may be controlled. As a result, without placing a restriction on the given block in the given frame, the coding apparatus 100 restricts the read data volume for the subsequent block only when the read data volume has exceeded S0_b and thereby, can proceed as far as possible without placing a restriction on reduction motion vectors.

According to the coding apparatus 100, the second maximum read data volume S1 per frame when image data of a search range that includes the search position that is on the reference frame and specified by a prediction vector is read in may be determined. As a result, the coding apparatus 100 can suppress exhaustion of the memory bandwidth since the total for each block of image data of a search range specified by a reduction motion vector is S0 or less, and the total for each block of image data of a search range specified by a prediction vector is S1 or less.

According to the coding apparatus 100, when detection of a motion vector of a given block is performed, the read data volume of a search range specified by a vector group may be controlled based on the read data volume of the search range specified by the vector group and Ssum_b. As a result, for each block in a given frame, the coding apparatus 100 performs control such that the read data volume of the search range specified by a vector group does not exceed Ssum_b. Consequently, the coding apparatus 100 can suppress exhaustion of the memory bandwidth since the total read data volume of all the blocks also does not exceed Ssum.

Further, the coding apparatus 100 selects from among combinations of prediction vectors and a motion vector of a block on a reduced image that corresponds to a given block, a combination for which the read data volume of a search range that includes the search positions specified on a reference frame by a vector included in the combination is Ssum_b or less. When detection of a motion vector of the given block is performed, the coding apparatus 100 may read in data of the search range that includes the search positions specified on the reference frame by a vector included in the selected combination. For example, by selecting from among combinations of Ssum_b or less, the combination having the greatest vector count, the coding apparatus 100 suppresses exhaustion of the memory bandwidth and can improve coding efficiency.

The coding apparatus 100 may identify the greatest member count of a vector group in a given frame by counting the spatial prediction vectors and/or temporal prediction vectors. As a result, for example, when the spatial prediction vector count and/or the temporal prediction vector count is low, the coding apparatus 100 increases the read data volume assigned to the reduction motion vector and is able to suppress exhaustion of the memory bandwidth and improve coding efficiency.

The coding method described in the present embodiment may be implemented by executing a prepared program on a computer such as a personal computer and a workstation. The coding program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

The coding apparatus 100 described in the present embodiment can be realized by an application specific integrated circuit (ASIC) such as a standard cell or a structured ASIC, or a programmable logic device (PLD) such as a field-programmable gate array (FPGA). Specifically, for example, the identifying unit 401 to the control unit 404 of the coding apparatus 100 are defined in hardware description language (HDL), which is logically synthesized and applied to the ASIC, the PLD, etc., thereby enabling manufacture of the coding apparatus 100.

According to one aspect of the present invention, an effect is achieved in that delays of processing involved in frame coding are suppressed and coding efficiency is improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer system comprising:
an identifying circuitry configured to identify at least one of a temporal prediction vector count and a spatial prediction vector count,
a temporal prediction vector being a vector of block at a same position as a block divided from a given frame among frames coded referring to a reference frame, and
a spatial prediction vector being a vector of a block adjacent to the block divided from the given frame; and
a determining circuitry configured to determine a first maximum read data volume for a single given frame when image data is read in of a search range that includes a search position specified on the reference frame by a reduction motion vector of a block on a reduced image obtained by reducing the given frame,
the first maximum read data volume being determined based on the at least one of the temporal prediction vector count and the spatial prediction vector count for the given frame identified by the identifying circuitry and a maximum read data volume that can be read in to detect a motion vector for the single given frame of the series of frames, the maximum read data volume being for the reference frame per unit time,
the reduction motion vector being detected by using the reduced image obtained by reducing the given frame by a given reduction rate and an image obtained by reducing the reference image;
the motion vector being detected by using the given frame and the reference frame in the search range that includes search positions that are on the reference frame and specified by the reduction motion vector and at least one of the temporal prediction vector, and spatial prediction vector; and
the first maximum read data volume being decreased when sum of the temporal prediction vector count and the spatial prediction vector count for the given frame increase.

2. The computer system according to claim 1, further comprising:
a calculating circuitry configured to calculate by dividing the first maximum read data volume determined by the determining circuitry, by a block count of blocks included in the given frame, a first threshold that corresponds to a given block selected from among blocks divided from the given frame; and
a control circuitry configured to control based on the first threshold calculated by the calculating circuitry, a read data volume for the search range that includes the search position specified on the reference frame by the motion vector of the block on the reduced image corresponding to the given block, the read data volume being controlled by being restricted the search range when the detection of the motion vector of the given block is performed.

3. The computer system according to claim 2, wherein the control circuitry controls the read data volume of the search range that includes the search position specified on the reference frame by the motion vector of a block on the reduced image corresponding to a block selected subsequent to the given block, when the first threshold is less than the read data volume of the search range that includes the search position specified on the reference frame by the motion vector of the block on the reduced image corresponding to the given block.

4. The computer system according to claim 3, wherein the determining circuitry determines based on a member count, the maximum read data volume that can be read in of the reference frame per unit time, for the single given frame among the series of frames, and the first maximum read data volume, a second maximum read data volume for the single given frame when image data is read in of a search range that includes a search position specified on a reference frame by the temporal prediction vector or the spatial prediction vector.

5. The computer system according to claim 4, wherein the calculating circuitry calculates based on the first maximum read data volume and the second maximum read data volume determined by the determining circuitry and the block count of blocks included in the given frame, a second threshold that corresponds to the given block, and the control circuitry controls based on the second threshold calculated by the calculating circuitry, the read data volume of the search range that includes the search positions specified on the reference frame by vector group corresponding to the given block, when the detection of the motion vector of the given block is performed.

6. The computer system according to claim 5, wherein the control circuitry controls the read data volume of the search range that includes the search positions on the reference frame specified by the vector group corresponding to the given block, by selecting from among combinations of the temporal prediction vector, the spatial prediction vector and a motion vector of the block on the reduced image corresponding to the given block, a combination for which the read data volume of the search range that includes search positions specified on the reference frame by vectors included in the combination is the second threshold or less.

7. The computer system according to claim 1, wherein the identifying circuitry identifies a count of motion vectors of blocks adjacent to the block divided from the given frame and/or motion vectors of blocks at the same position as the block divided from the given frame among frames coded referring to the reference frame.

8. A data processing method comprising:
identifying at least one of a temporal prediction vector count and a spatial prediction vector count,
a temporal prediction vector being a vector of block at a same position as a block divided from a given frame among frames coded referring to a reference frame, and
a spatial prediction vector being a vector of a block adjacent to the block divided from the given frame; and
determining a first maximum read data volume for a single given frame when image data is read in of a search range that includes a search position specified on the reference frame by a reduction motion vector of a block on a reduced image obtained by reducing the given frame, the first maximum read data volume being determined based on the at least one of the temporal prediction vector count and the spatial prediction vector count for the given frame and a maximum read data volume that can be read in to detect a motion vector for the single given frame of the series of frames, the maximum read data volume being for the reference frame per unit time, the reduction motion vector being detected by using the reduced image obtained by reducing the given frame by a given reduction rate and an image obtained by reducing the reference image;

the motion vector being detected by using the given frame and the reference frame in the search range that includes search positions that are on the reference frame and specified by the reduction motion vector and at least one of the temporal prediction vector, and spatial prediction vector; and the first maximum read data volume being decreased when sum of the temporal prediction vector count and the spatial prediction vector count for the given frame increase, wherein the data processing method is executed by a computer.

9. A non-transitory, computer-readable recording medium storing therein a data processing program causing a computer to execute a process comprising:

identifying at least one of a temporal prediction vector count and a spatial prediction vector count, a temporal prediction vector being a vector of block at a same position as a block divided from a given frame among frames coded referring to a reference frame, and a spatial prediction vector being a vector of a block adjacent to the block divided from the given frame; and determining a first maximum read data volume for a single given frame when image data is read in of a search range that includes a search position specified on the reference frame by a reduction motion vector of a block on a reduced image obtained by reducing the given frame, the first maximum read data volume being determined based on the at least one of the temporal prediction vector count and the spatial prediction vector count for the given frame and a maximum read data volume that can be read in to detect a motion vector, for the single given frame of the series of frames, the maximum read data volume being for the reference frame per unit time, the reduction motion vector being detected by using the reduced image obtained by reducing the given frame by a given reduction rate and an image obtained by reducing the reference image;

the motion vector being detected by using the given frame and the reference frame in the search range that includes search positions that are on the reference frame and specified by the reduction motion vector and at least one of the temporal prediction vector, and spatial prediction vector; and the first maximum read data volume being decreased when sum of the temporal prediction vector count and the spatial prediction vector count for the given frame increase.

* * * * *